(12) United States Patent
Kashen et al.

(10) Patent No.: US 8,693,654 B2
(45) Date of Patent: Apr. 8, 2014

(54) LOCATION SENSITIVE CALLER AND CALLEE BASED CALL PRIORITIZATION

(75) Inventors: John J. Kashen, Essex, MD (US); Pramodh D. Narayan, Naperville, IL (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1118 days.

(21) Appl. No.: 12/390,645

(22) Filed: Feb. 23, 2009

(65) Prior Publication Data

US 2010/0215163 A1 Aug. 26, 2010

(51) Int. Cl.
*H04M 3/42* (2006.01)

(52) U.S. Cl.
USPC ................................. 379/201.01; 379/201.02

(58) Field of Classification Search
USPC ............. 379/201.02, 210.01, 210.02, 211.01; 455/413, 419
See application file for complete search history.

(56) References Cited

U.S. PATENT DOCUMENTS

| | | | |
|---|---|---|---|
| 4,266,098 A | 5/1981 | Novak | |
| 5,559,860 A | 9/1996 | Mizikovsky | |
| 5,757,899 A * | 5/1998 | Boulware et al. | 379/196 |
| 6,101,246 A | 8/2000 | Heinmiller et al. | |
| 6,263,064 B1 | 7/2001 | O'Neal et al. | |
| 6,944,276 B1 * | 9/2005 | Nguyen et al. | 379/142.02 |
| 7,020,142 B2 | 3/2006 | Kodaira | |
| 7,197,127 B2 | 3/2007 | Stevens | |
| 7,242,754 B2 | 7/2007 | Adams et al. | |
| 7,295,514 B2 | 11/2007 | Cha et al. | |
| 7,298,833 B2 | 11/2007 | Klein et al. | |
| 7,315,734 B2 | 1/2008 | Friedenfelds et al. | |
| 7,333,496 B1 * | 2/2008 | Patel et al. | 370/395.42 |
| 7,466,218 B2 * | 12/2008 | Oesterling | 340/426.18 |
| 7,877,084 B2 * | 1/2011 | Martin et al. | 455/414.1 |
| 8,122,137 B2 * | 2/2012 | Appelman et al. | 709/229 |
| 8,265,669 B2 * | 9/2012 | Alward | 455/466 |
| 2002/0154752 A1 * | 10/2002 | Carpenter | 379/201.01 |
| 2002/0189237 A1 * | 12/2002 | Bidner et al. | 60/277 |
| 2003/0076941 A1 | 4/2003 | Tiliks et al. | |
| 2004/0105536 A1 * | 6/2004 | Williams | 379/211.02 |
| 2005/0070230 A1 * | 3/2005 | Das et al. | 455/69 |
| 2005/0195954 A1 | 9/2005 | Klein et al. | |
| 2006/0059092 A1 * | 3/2006 | Burshan et al. | 705/51 |
| 2006/0069782 A1 * | 3/2006 | Manning et al. | 709/227 |
| 2006/0072726 A1 * | 4/2006 | Klein et al. | 379/201.01 |
| 2006/0078105 A1 * | 4/2006 | Korn et al. | 379/210.02 |
| 2006/0085419 A1 * | 4/2006 | Rosen | 707/9 |
| 2007/0129079 A1 * | 6/2007 | Schwarz et al. | 455/450 |
| 2007/0213034 A1 | 9/2007 | Cai et al. | |
| 2008/0008162 A1 | 1/2008 | Martinez et al. | |
| 2008/0051066 A1 * | 2/2008 | Bandhole et al. | 455/413 |
| 2008/0063176 A1 | 3/2008 | Strieter et al. | |
| 2008/0146200 A1 * | 6/2008 | Martin et al. | 455/413 |

(Continued)

*Primary Examiner* — William Deane, Jr.
(74) *Attorney, Agent, or Firm* — Matthew Chung; Roberts Mlotkowski Safran & Cole, P.C.

(57) ABSTRACT

A system and method of call prioritization and, in particular, a system and method of location sensitive caller and callee based voice call prioritization are disclosed. A method includes: determining that an incoming call is designated as priority by a caller; determining that the caller is contained in a whitelist; and handling the incoming call as a priority call at a callee telephone when the incoming call is designated as priority by the caller and the caller is contained in the whitelist.

25 Claims, 7 Drawing Sheets

(56) References Cited

U.S. PATENT DOCUMENTS

| | | | |
|---|---|---|---|
| 2009/0029693 A1* | 1/2009 | Liwell et al. | 455/419 |
| 2009/0129561 A1* | 5/2009 | Siegel et al. | 379/45 |
| 2009/0213001 A1* | 8/2009 | Appelman et al. | 342/357.07 |
| 2010/0067519 A1* | 3/2010 | Mang et al. | 370/352 |
| 2010/0074420 A1* | 3/2010 | Bauchot et al. | 379/88.02 |
| 2010/0189237 A1* | 7/2010 | Gross et al. | 379/201.01 |
| 2011/0040626 A1* | 2/2011 | Lin | 705/14.63 |
| 2011/0211531 A1* | 9/2011 | Woodson et al. | 370/328 |

* cited by examiner

LOCATION SENSITIVE CALLER AND CALLEE BASED CALL PRIORITIZATION

FIELD OF THE INVENTION

The invention generally relates to a system and method of call prioritization and, in particular, to a system and method of location sensitive caller and callee based voice call prioritization.

BACKGROUND

Faced with an increasingly difficult challenge in growing both average revenue per user (ARPU) and numbers of subscribers, network carriers are trying to develop a host of new products, services, and business models based on data services. One such service is call routing and voicemail services. While a lot of advances have been made in the Value Added Services (VAS) domain in general and voicemail technology in particular (to some extent revealed by the fact that basic voicemail services are essentially given away for free by most wireless and operators and many wire-line operators), not much has been accomplished in the callee centric control area.

As telephone technology moves toward an IP Multimedia Subsystem (IMS) architecture, legacy subscribers (e.g., non IMS subscribers) will include both wired subscribers using plain old telephone system (POTS) as well as cellular subscribers using the predominantly Signaling System 7 (SS7) infrastructure for call control, routing and completion, including handoffs between carriers that are part of the Public Switched Telephony Network (PSTN).

Existing telephone handsets do not support a ready interface that is relevant during call origination. Instead, existing handsets require the use of feature codes (e.g., Intelligent Network (IN) architecture) for call origination services, which require specific Class Five or better switch processing to receive and process the call request. As IMS is introduced to the telecommunications infrastructure, there will be a preponderance of non-IMS handsets (a combination of both wired and cellular subscribers) requiring continuance of the use of feature codes based approach for what is expected to be a extended migratory period. During the migratory period, systems and services that do not accommodate both IMS and non-IMS subscribers will be at a competitive disadvantage.

For example, many telephone users have experienced a situation in which their telephone rings at an inopportune time (e.g., during a business meeting). With conventional caller ID, the callee can determine who is calling. However, the callee cannot determine from caller ID whether it is a routine call or an urgent call from the caller. Thus, the callee is faced with the undesirable situation of having to decide whether to answer the call (and interrupt the meeting for a routine call that could have waited until later) or ignore the call (and possibly miss what was an urgent call from the caller).

Accordingly, there exists a need in the art to overcome the deficiencies and limitations described hereinabove.

SUMMARY

In a first aspect of the invention, a method implemented in a computer infrastructure for providing call prioritization comprises: determining that an incoming call is designated as priority by a caller; determining that the caller is contained in a whitelist; and handling the incoming call as a priority call at a callee telephone when the incoming call is designated as priority by the caller and the caller is contained in the whitelist.

In another aspect of the invention, there is a computer program product comprising program code stored on a tangible storage medium. The program code, when executed on a computing device, causes the computing device to: receive and store a whitelist; access the whitelist when a voice call is initiated from a caller telephone to a callee telephone; and generate a priority output at the callee telephone when the voice call is designated as priority at the caller telephone and when the caller telephone is identified in the whitelist, otherwise generate a normal output at the callee telephone.

In another aspect of the invention, there is a system for providing call prioritization comprising a telephone device. The telephone device includes a combination of hardware and software that operates to: determine that an incoming call is designated as priority by a caller and that the caller is contained in a whitelist stored in the telephone device; and generate one of a normal output and a priority output based on the determining.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
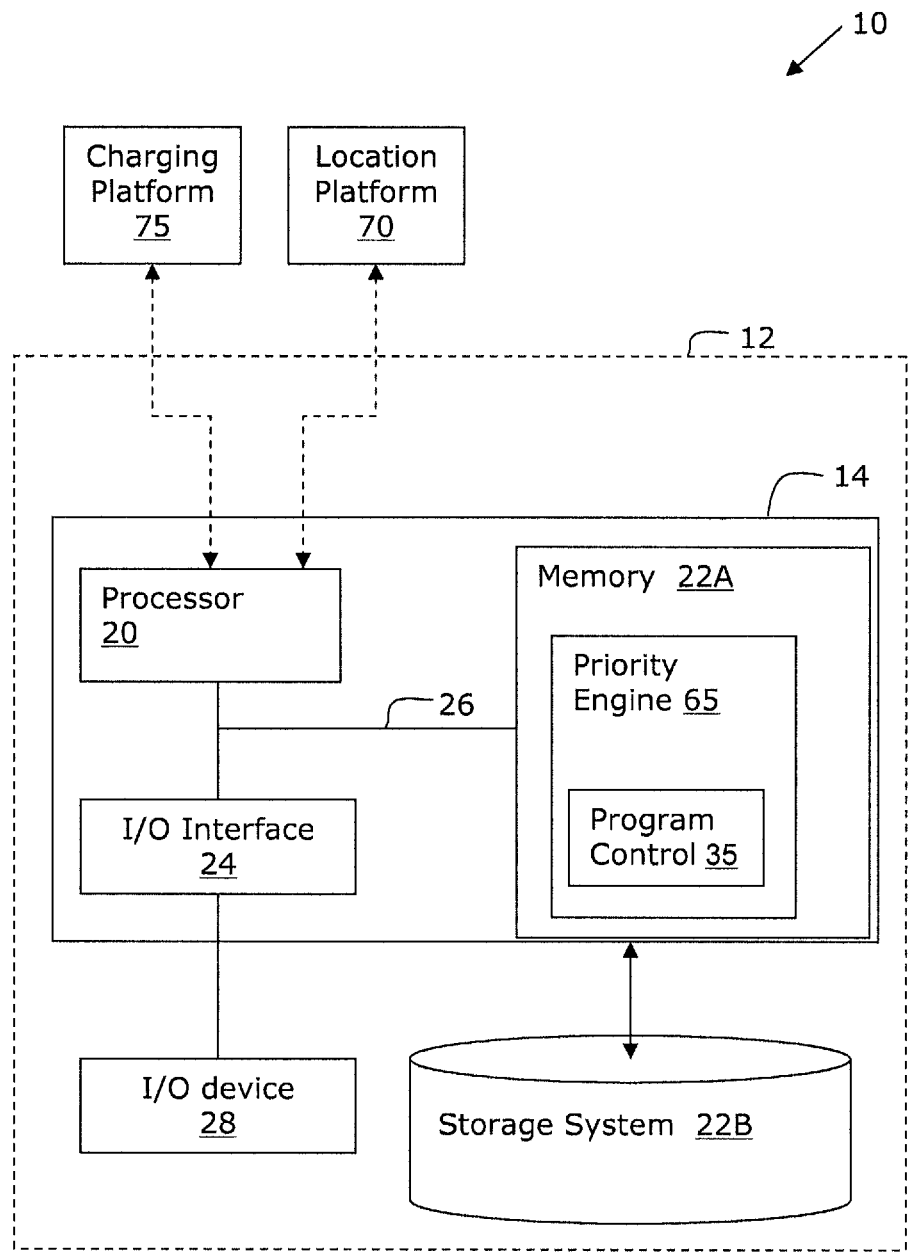
FIG. 1 shows an illustrative environment for implementing processes in accordance with the present invention.

The invention generally relates to a system and method of call prioritization and, in particular, to a system and method of location sensitive caller and callee based voice call prioritization. In accordance with aspects of the invention, a subscriber (e.g., telephone user) defines a list of callers (e.g., a whitelist), the whitelist representing callers from whom the subscriber is willing to receive a priority call. When a caller initiates a call to the callee, the caller designates the call as either normal or priority. The combination of the caller designating a call as priority and the caller being contained in the callee's whitelist will result in a priority call to the callee. Put another way, a call is handled as a priority call at the callee telephone when both of the following occur: (1) the caller designates the call as priority and (2) the caller is contained in the callee's whitelist. A call that is handled as a priority call at the callee telephone causes the callee telephone to generate a unique priority output, such as, for example, a unique ring tone (e.g., for IMS and/or non-IMS telephones), a customized audio and/or visual output (e.g., for IMS enabled telephones), break through a "busy" setting, etc. In this manner, call priority may be controlled by users when making a call (e.g., via the caller designation as priority) and when receiving a call (e.g., via the callee whitelist).

More specifically, in embodiments, a subscriber defines a whitelist of caller identifications (e.g., recognizable telephone numbers, MSI ISDNs, SIP URIs, etc.), which represent endpoints from which the subscriber is willing to receive a priority call. When a caller initiates a call from an endpoint that is contained in the whitelist and the caller designates the call as priority, that call will be treated as a priority call at the callee device. For example, calls that are treated as priority calls at the callee device may cause the callee device to ring with a unique ringtone, display a visual notification of priority, break through a "busy" setting on the callee device, etc. In this manner, the callee is alerted to the priority status of the incoming call.

Alternatively, when a caller whose endpoint is contained in the whitelist does not designate that an outgoing call is a priority call, then that call will be treated as a normal call (e.g., not a priority call) at the callee device. Also, a call from a caller whose endpoint is not contained in the whitelist will be treated as a normal call, regardless of whether or not the caller designates the call as a priority call. In this manner, implementations of the invention provide a method for callers to designate on a call-by-call basis whether a particular call is a priority call, and for the callee to treat as priority calls only those calls that (1) originate from callers identified in a callee-defined whitelist and (2) are designated as priority by the caller when the call is originated.

In additional embodiments, a subscriber may define one or more locations (e.g., via geoboundaries) and define respective whitelists for each location. In this manner, a particular whitelist may be used to filter incoming calls when a callee is located at a predefined location. For example, a subscriber may define a "work" location using geoboundaries and a "work" whitelist associated with the "work" location. When the subscriber is at the "work" location, only calls from callers contained in the "work" whitelist will be treated as priority calls at the subscriber end (provided, in embodiments, that the caller initially designated the call as a priority call).

In even further embodiments, a subscriber may define time of day settings to filter incoming calls. Similar to locations described above, a subscriber may associate a particular whitelist with a predefined date and time range. In this manner, when the subscriber receives an incoming call during this date and time range, only calls from callers contained in the associated whitelist will be treated as priority calls (provided, in embodiments, that the caller initially designated the call as a priority call).

Accordingly, in implementations of the invention, voice call prioritization is performed on a call by call basis by both the caller and the callee. Particularly, a caller is responsible for initially determining and indicating that a particular call is important. However, a callee still controls who gets on a whitelist and therefore has the ability to control his privacy (i.e., by handling calls from non-whitelisted callers as non-priority, regardless of how the caller designated the call). Moreover, callees can use location and time based controls to further control privacy. In this manner, implementations provide a callee controlled system in which priority calls can be originated and controlled, rather than voice call priority being addressed in the context of other ambient voice traffic. Generic caller identification is also supported, and is one of the underlying capabilities that is leveraged by implementations of the invention.

Additionally, in embodiments, multiple underlying networks and handsets (as opposed to just mobile handsets) are supported by the present invention. For example, implementations of the invention may be used across both IP as well as SS7 and existing telecommunications networks. Processes described herein may be implemented in multiple underlying networks, including IMS and non IMS networks (including cellular networks). For example, implementations of the invention work in multiple conventional underlying telecommunications network environments regardless of the origination network and the terminating network types.

Moreover, embodiments of the invention do not explicitly rely on an SCP-based implementation, although such implementations could be utilized for legacy SS7 networks. Instead, in embodiments, all underlying networks are supported. Additionally, embodiments use a feature code based approach for IN (Intelligent Network) infrastructure, as opposed to solely relying on customer premise equipment.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a priority engine 65 (e.g., application) having a program control 35 (e.g., computer program code), the priority engine 65 making the computing device 14 operable to perform the processes described herein, such as, for example, determine call prioritization.

In embodiments, the priority engine 65 determines whether a call from a caller (e.g., caller telephone device) to a callee (e.g., callee telephone device) is indicated as a priority call by the caller. For example, the priority engine 65 may receive and interpret a feature code entered by the caller, or may receive a SIP message generated at the caller telephone, either of which may indicate that the call is a priority call. Moreover, in embodiments, the priority engine 65 accesses a callee profile stored in a storage system 22B and determines whether the caller (e.g., originating endpoint) is contained in a whitelist. In situations where both the call is designated as priority by the caller and the caller is contained in the whitelist of the callee, the priority engine 65 causes the call to be treated as a priority call at the callee telephone.

According to aspects of the invention, priority calls are handled by causing a unique output at the at the callee telephone. For example, when the callee telephone is a non-IMS device, a priority call may ring with a unique ring tone that is associated with priority calls. Additionally, when the callee telephone is an IMS-enabled device, a priority call may generate a unique audio and/or video output from the IMS device. Additionally or alternatively, when the callee has his or her telephone set to "busy" or "do not disturb" mode, a priority call may override this setting and cause the callee telephone to ring with a particular ring tone, generate a particular audio and/or video output, etc.

In contrast, a normal call (e.g., a call that is not a priority call) is handled at the callee telephone in any suitable conventional manner. For example, a normal call will cause a normal output (e.g., default ringtone) at the callee telephone. Alternatively, when a callee telephone is set to "busy" or "do not disturb" mode, a normal call will not break through.

In further embodiments, the priority engine 65 obtains subscriber (e.g., callee) location information from a location platform 70. In this manner, the priority engine 65 may optionally take into account the current location of the subscriber (e.g., callee) when performing call prioritization processes described herein. For example, a subscriber may use the browser interface to define a geoboundary in his or her profile (e.g., stored at the storage system 22B), and may define a whitelist associated with that geoboundary. The geoboundary may be represented as an entrance point or an exit point of a certain geographic location, e.g., represented in longitude and latitude coordinates. When the callee is within that geoboundary, as determined by the location platform 70 and communicated to the priority engine 65, only calls from a caller on the whitelist and designated by that caller as priority will be treated as priority calls by the priority engine 65.

The location platform 70 may be based on Bluetooth technology, GPS, A-GPS, or triangulation methodologies, all of which are known to those of skill in the art such that further explanation is not believed necessary. The location platform 70 may use, for example, an Open LS to SIP adapter to send location messages (e.g., a geo-boundary was crossed) to the priority engine 65. In this manner, the computing device 14 can factor in location of the caller using SIP enabled signaling for seamless integration into an IP Multimedia subsystem network. The location platform 70 sends notifications (e.g., SIP Notify) to the priority engine 65 as appropriate. For example, in embodiments, the location platform 70 sends changes to the priority engine 65 to provide further optimization.

In even further embodiments, the priority engine 65 takes date and/or time of day settings into account when determining whether a call is to be handled as a priority call. Similar to geoboundaries described above, a subscriber may use the browser interface to define a date and/or time range in his or her profile (e.g., stored at the storage system 22B), and may define a particular whitelist associated with that date/time. During that date/time, the priority engine 65 operates such that only calls from a caller on the whitelist and designated by that caller as priority will be treated as priority calls at the callee telephone.

As is apparent from the above description, a subscriber may define more than one whitelist in their profile. For example, a first whitelist may be associated with a first location defined by a first set of geoboundaries. A second whitelist may be associated with a date and/or time range. And a third whitelist may be defined for all other locations (e.g., not the first location) and all other dates and times other than the specified date/time. Additionally, a subscriber may define a location and/or date/time setting in which no calls will be treated as priority (e.g., by associating a whitelist that contains no caller identities). In this manner, a subscriber may customize his or her profile to handle priority calls based on any combination of: caller identity, callee location, and date/time.

In embodiments, when a subscriber defines plural whitelists, those whitelists may have different callers listed therein. For example, the first and second whitelists described above may be different from one another. However, plural whitelists defined by a subscriber need not be mutually exclusive. For example, a spouse or child may be contained in all of a subscriber's whitelists, such that the spouse or child always has the ability to make priority call to the subscriber.

Still referring to FIG. 1, in further embodiments, the system and method provides a charging platform 75 to provide charging models for services rendered. The charging platform 75 may be maintained, deployed, created and/or serviced by the service provider. The charging platform 75 is designed to generate a charging record for services rendered to a subscriber, e.g., the callee will be charged for the services rendered based on the charging model implemented by the system and method of the invention. In embodiments, the service provider can calculate an amount to be charged, based on many different considerations and generate the charging record to be sent to the charging platform 75. In turn, the charging platform 75 can generate an invoice and/or deduct a usage charge from an account of the subscriber (callee). The charging platform 75 also supports flexible charging models supported via an IMS compliant Customer Care Framework (CCF). This allows for the flexible application of charging models by downstream mediation, rating, billing and settlement platforms to support the full breadth of business models.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 35) in order to reduce the number of times code must be retrieved from bulk storage during execution. Further, the computing device 14 is in communication with an external I/O device/resource 28 and the storage system 22B. The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc. In embodiments, I/O device/resource 28 may be used to enter subscriber preferences (e.g., whitelist information).

The processor 20 executes computer program code (e.g., program control 35), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. In embodiments, the storage system 22B may be used to the subscriber profile, including whitelists, geoboundaries, date/time settings, etc.

The computing device 14 can comprise any general purpose computing article of manufacture capable of executing computer program code installed thereon (e.g., a personal computer, server, wireless notebook, smart telephone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a primary service provider, such as a Solution Integrator, could offer to perform the processes described herein. In this case, the primary service provider can create, maintain, deploy, support, etc., a computer infrastructure that performs the process steps of the invention for one or more customers. In return, the primary service provider can receive payment from the customer(s) under a subscription and/or fee agreement and/or the primary service provider can receive payment from the sale of advertising content to one or more third parties.

Exemplary Architecture

Figure 2:
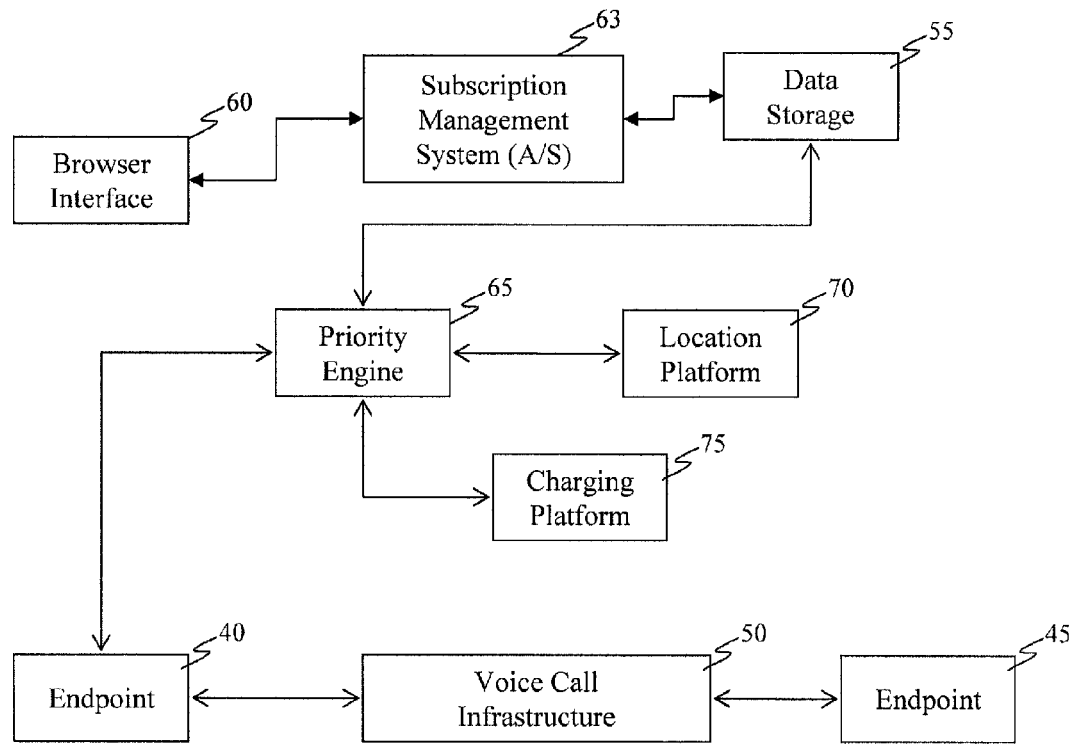
FIG. 2 shows an exemplary architecture in accordance with aspects of the present invention.

FIG. 2 shows an exemplary architecture in accordance with aspects of the invention. Particularly, the architecture includes a first endpoint 40 (e.g., callee telephone) and a second endpoint 45 (e.g., caller telephone) connected to one another by a voice call infrastructure 50. In embodiments, each endpoint 40, 45 comprises a telephone device, such as, for example, an IP Multimedia Subsystem (IMS) compliant telephone or a non-IMS telephone (e.g., plain old telephone service (POTS) and cellular telephone).

The voice call infrastructure 50 may comprise components that enable it to handle different call protocols (e.g., Public Switch Telephone Network (PSTN), cellular network, IMS network, etc.), as is known in the art such that further explanation is not believed necessary. In this manner, the voice call infrastructure 50 is structured and arranged to facilitate voice calls between any two endpoint types (e.g., POTS, cellular, IMS, etc.).

In embodiments, the architecture includes data storage 55 in which subscriber preferences (e.g., whitelists, geoboundaries, date/time settings, etc.) are stored in a profile associated with the subscriber. For example, the data storage 55 may comprise storage system 22B described in FIG. 1.

Additionally, the environment may include a browser interface 60, through which a subscriber may enter (e.g., designate, define, etc.) preferences that are stored in the profile in the data storage 55. The browser interface 60 may comprise, for example, a graphical user interface through which the user may enter his or her preferences. In embodiments, the browser interface 60 is operatively connected to the data storage 55 through a subscription management system 63 (e.g., an application server) such that preferences entered at the browser interface 60 are stored in the subscriber profile in the data storage 55.

Furthermore, the architecture includes the priority engine 65, as described above with respect to FIG. 1. Particularly, the priority engine 65 operates to determine priority of a call from the second endpoint (e.g., caller telephone) 45 to the first endpoint (e.g., callee telephone) 40 by determining whether the caller designated the call as priority and by determining whether the caller is contained in the callee-defined whitelist stored in data storage 55. In additional embodiments the architecture may also include a location platform 70 and charging platform 75, as described above with respect to FIG. 1.

In embodiments, one or both of the first and second endpoints 40, 45 may be a telephone comprising or comprised in the computing device 14 depicted in FIG. 1. For example, one or both of the caller telephone and the callee telephone may comprise an IMS compatible telephone comprising a program control that is structured and arranged to perform one or more of the processes described herein. However, the invention is not limited to IMS-enabled telephones. To the contrary, call prioritization may be provided by the processes described herein between any two types of telephones (e.g., POTS, cellular, IMS, etc.) across any type(s) of network(s).

In further embodiments, the first endpoint 40 (e.g., the callee telephone) may comprise an IMS compatible telephone that comprises at least one of: that data storage 55, the browser interface 60, and the priority engine 65. For example, the first endpoint 40 may comprise a computing device 14 in which the storage system 22B corresponds to the data storage 55, the I/O Interface 24 corresponds to the browser interface 60, and where the priority engine 65 resides on the computing device 14. Alternatively, at least one of the that data storage 55, the browser interface 60, and the priority engine 65 may be embodied outside the callee telephone, such as, for example, being provided by a telephone service provider (e.g., network carrier).

Figure 3:
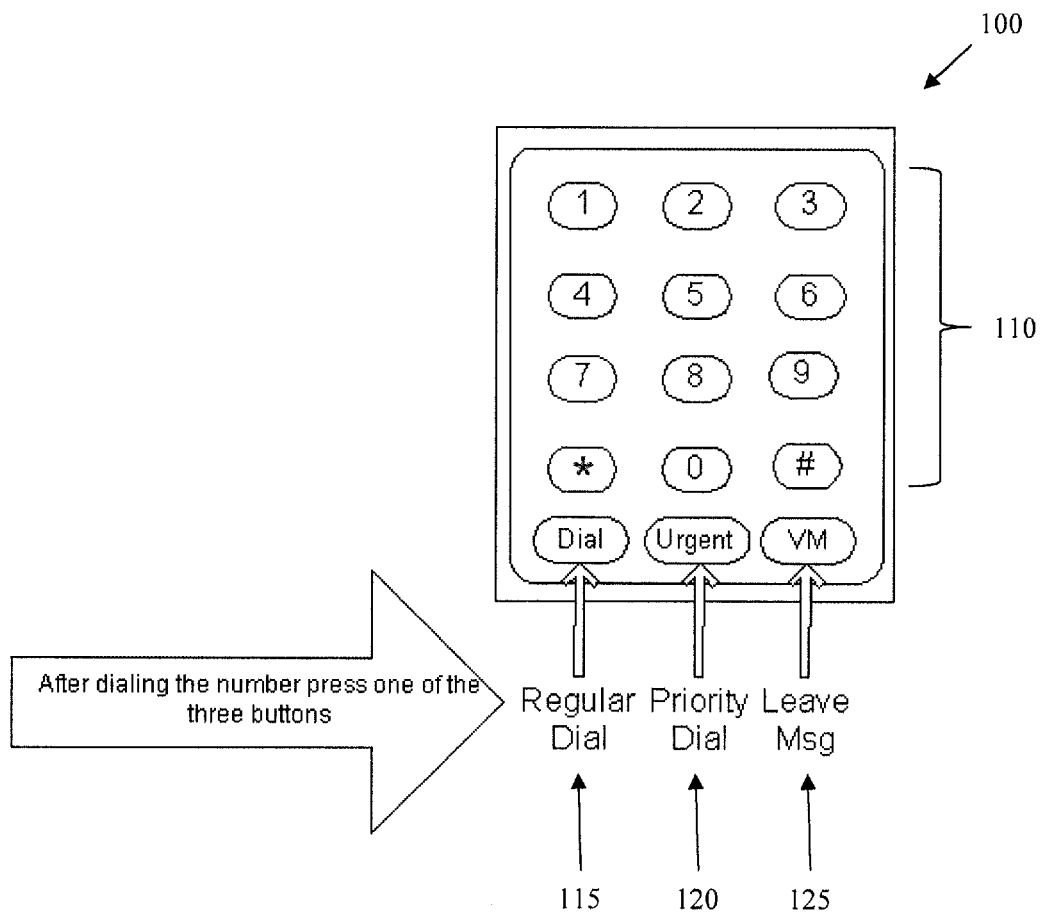
FIG. 3 shows an exemplary interface in accordance with aspects of the present invention.

FIG. 3 depicts a dialing interface 100 in accordance with aspects of the invention. The dialing interface 100 may be used, for example, to initiate a call from an originating endpoint (e.g., second endpoint 45 of FIG. 2). In embodiments, the dialing interface 100 is a graphical user interface that is presented on touchscreen I/O interface of a softphone (e.g., IMS enabled telephone).

In embodiments, the dialing interface 100 comprises a graphical representation of a standard dialing keypad 110, including standard dialing buttons. Additionally, the dialing interface 100 includes a regular dial button 115, a priority dial button 120, and a leave message button 125. According to aspects of the invention, the dialing interface may be used by a caller to initiate a call to a callee. For example, the caller may select one of the three buttons 115, 120, and 125 when dialing a telephone number of a callee. When the regular dial button 115 is selected, the call is initiated as a normal call (e.g., not a priority call). When the priority dial button 120 is selected, the call is initiated as a priority call. When the leave message button 125 is selected, the call goes straight to the callee's voicemail without causing the callee telephone to ring or otherwise alert the callee of the incoming call. Alternatively, on non-IMS telephones, the "priority" and "leave message" functionality may be achieved by utilizing IN feature codes (e.g., pre-defined dialing codes).

In embodiments, a telephone device may be configured to perform the functions of both callee and caller. For example, an IMS-enabled softphone may comprise the data storage 55, the browser interface 60, and the priority engine 65, such that the telephone is structured and arranged to receive calls and determine priority. Moreover, the same telephone may comprise an application that presents the dialing interface 100, such that the telephone can be used to originate a call as described above with respect to FIG. 3.

Accordingly, as described above with respect to the architecture depicted in FIG. 2 and the interface depicted in FIG. 3, aspects of the invention permit a subscriber (e.g., callee) to specify a whitelist via a supported user interface that permits a subset of endpoint definitions from which priority calls can be originated. Moreover, the callee can optionally specify specific geoboundaries within which the priority flag applies if the callee is within the geoboundary. The caller explicitly, on a call by call basis, is able to designate that a given outbound call is a priority call. For example, when the caller is utilizing a non-IMS telephone, the caller may designate that the call is a priority call by using a feature code that is IN (Intelligent Network) compliant. For example, the caller may dial a predefined prefix on the telephone keypad before dialing the number of the callee. Alternatively, when the caller is utilizing an IMS telephone (e.g., an IMS enabled soft-telephone that uses SIP signaling), the caller may designate the call as a priority call through an interface (e.g., dialing interface 100) provided on a touch-screen display of the IMS telephone. Additionally, in IMS compliant phones, the interface may include the ability to leave a message at the callee voicemail box instead of causing the callee device to ring and completing the call (e.g., go straight to the callee's voicemail).

Exemplary Processes

FIGS. 4-7 illustrate exemplary processes in accordance with the present invention. The steps of FIGS. 4-7 may be implemented on the computer infrastructure of FIG. 1 and/or the architecture of FIG. 2, for example. The flow or swim lane diagrams in FIGS. 4-7 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams, and combinations of the flow diagrams illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1 or architecture of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
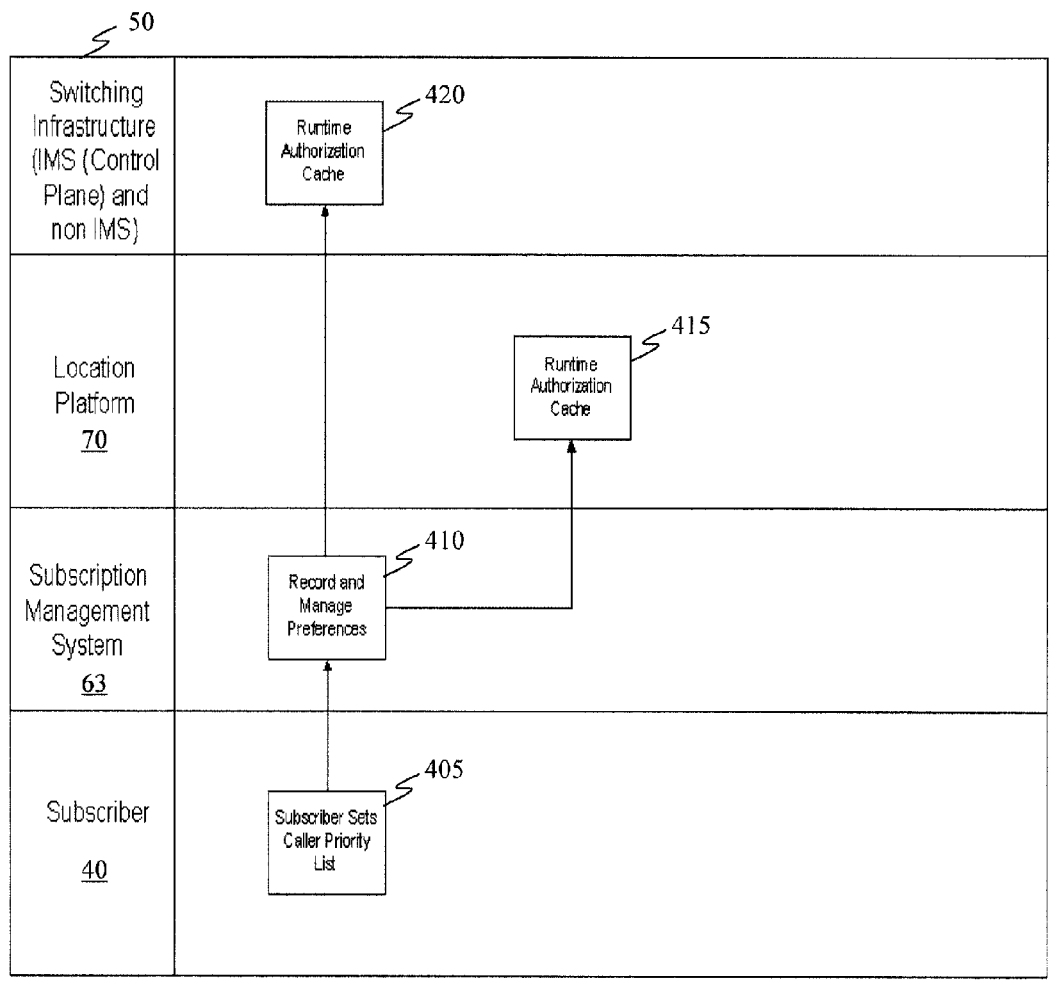
FIGS. 4-7 are flow diagrams showing a process in accordance with aspects of the present invention.

FIG. 4 shows a subscription provisioning flow according to aspects of the invention, in which four roles are shown: the first endpoint (e.g., subscriber) 40, the voice call infrastructure (e.g., switching infrastructure) 50, the subscription management system 63, and the location platform 70. More specifically, at step 405 a subscriber utilizes the browser interface (e.g., browser interface 60) to define one or more caller priority lists (e.g., whitelist). Step 405 may also include the subscriber defining one or more locations using geoboundaries, as described above with respect to FIG. 2. Step 405 may additionally include the subscriber using the browser interface to define one or more date/time settings, as described above. Still further, step 405 may comprise associating respective whitelists with any one of the locations and date/time settings, as described above. All of the subscriber preferences input at step 405 may be input using the browser interface.

At step 410, the preferences entered at step 405 are managed and stored in a profile associated with the subscriber. For example, the preferences may be stored in a data storage (e.g., data storage 55) that is comprised in the subscriber telephone. Alternatively, the data storage may be maintained by a third party subscription management system (e.g., the subscriber's telephone service provider).

At steps 415 and 420, data from the subscriber profile is replicated to multiple physical caches (e.g., runtime authorization caches) associated with, for example, the location platform (e.g., location platform 70) and switching infrastructure (e.g., voice call infrastructure 50). Such data replication assists with optimization of runtime call flow. Other physical caches to which subscriber profile data may be replicated include, but are not limited to: HLR's and routing infrastructure for Cellular networks and subscribers; a Home Subscriber Server (HSS) for IMS networks; subscriber repositories within the Class 4 and Class 5 infrastructure which support IN (Intelligent Network) features; in the case of IMS compliant devices, the handset itself could store (and be updated with the changes) a whitelist which is then triggered based on a SIP based call flow; and shared infrastructure within carrier networks to permit routing and handoffs across different networks.

Figure 5:
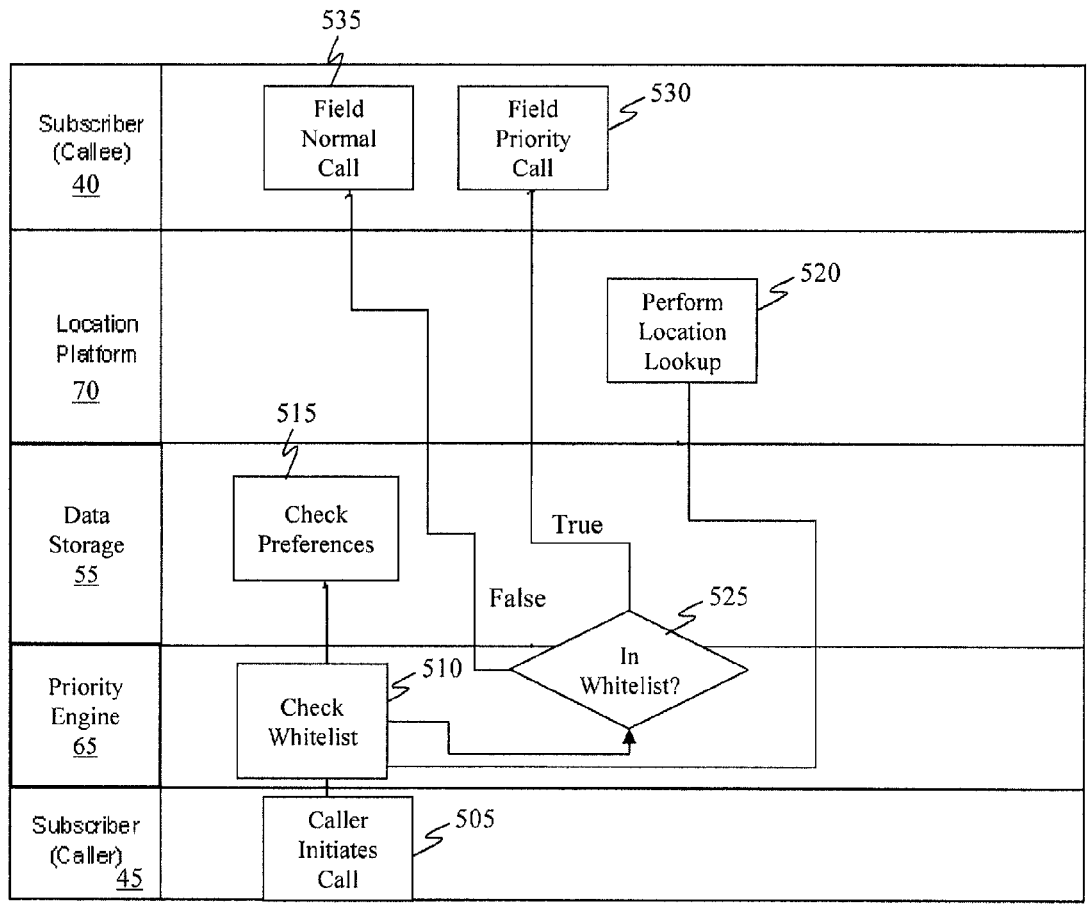

FIG. 5 depicts a call flow according to aspects of the invention, in which five roles are shown: the first endpoint (e.g., callee) 40, second endpoint (e.g., caller) 45, data storage 55, priority engine 65, and location platform 70. At step 505, a caller initiates a call to a callee and designates the call as a priority call (e.g., as described above with respect to FIG. 2). At step 510, the priority engine (e.g., priority engine 65) gathers data to determine whether the call will be treated as a priority call. For example, the priority engine may obtain the callee location from the location platform at step 520. Also, the priority engine may obtain other preferences (e.g., date/time settings, whitelist associated with location and/or date/time settings) from a runtime subscriber cache of data storage 55 that contains the callee profile data. At step 525, the priority engine determines whether the caller is contained in the appropriate whitelist. If the caller is contained within the whitelist, then at step 530 the call is handled as a priority call at the callee telephone. On the other hand, if the caller is not contained in the whitelist, then at step 535 the call is handled as a normal call at the callee telephone.

Figure 6:
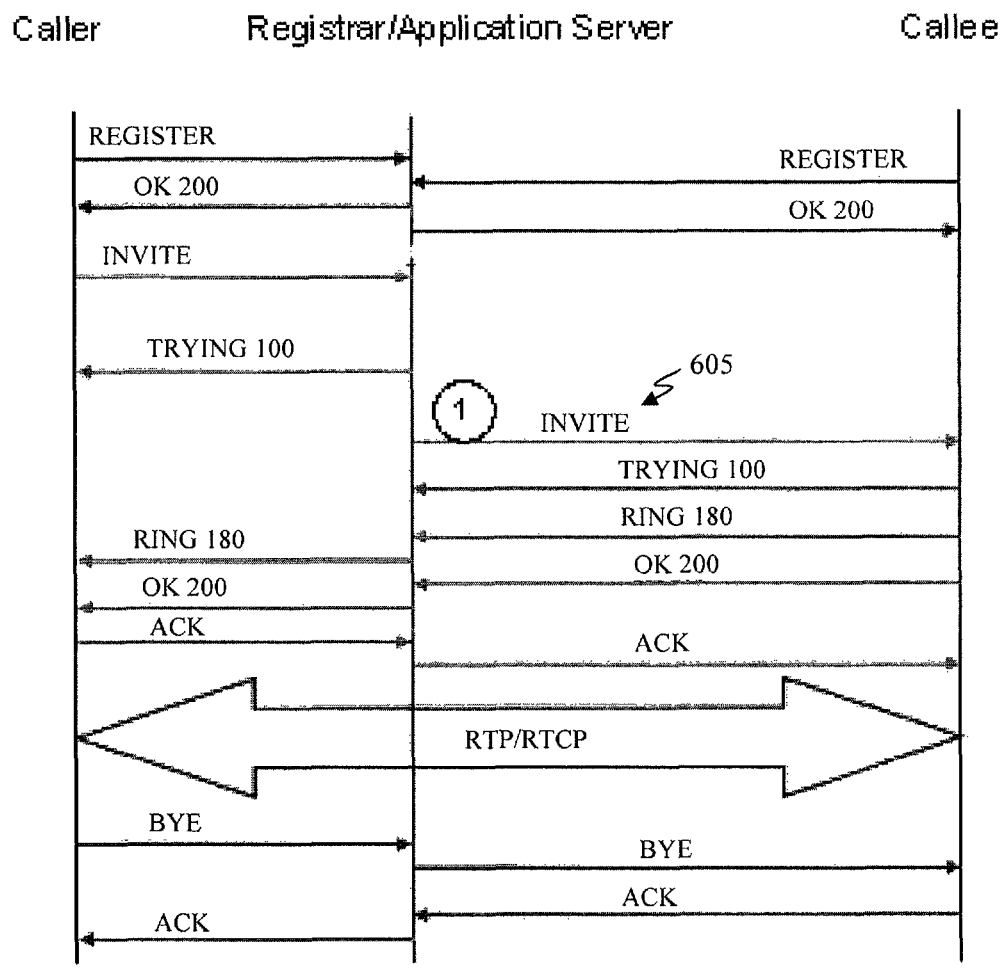

FIG. 6 shows a SIP call flow modification for a priority call in accordance with aspects of the invention. In embodiments, the standard voice call flow is modified by an application server to indicate priority in the UDP packet associated with an "SIP Invite" 605 as depicted in FIG. 6. By suing the SIP Invite 605, a call may be indicated as priority call in the SIP protocol.

Figure 7:
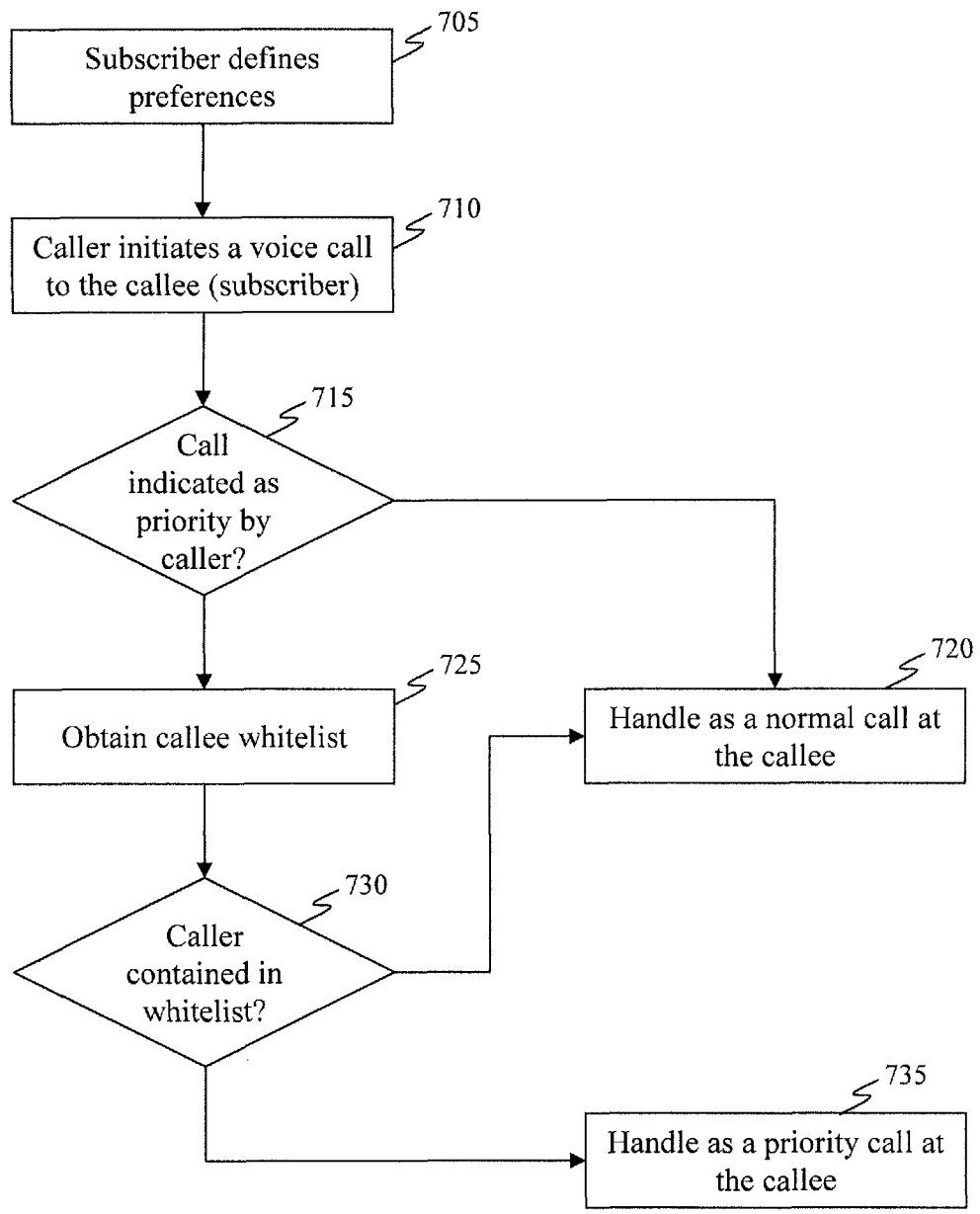

FIG. 7 shows a flow diagram depicting a process according to aspects of the invention. At step 705, a subscriber defines at least one whitelist using a browser interface (e.g., browser interface 60). The subscriber may also define one or more locations (e.g., defined by geoboundaries) and one or more date/time settings, and may further associate a respective whitelist with a location and/or date/time setting (e.g., as described above with respect to FIG. 2).

At step 710, a caller initiates a voice call to the subscriber (e.g., callee) by dialing the subscriber's telephone number. At step 715, the priority engine determines whether the call was designated as a priority call by the caller. For example, the priority engine determines whether a priority-indicating feature code (e.g., dialing prefix or suffix) was dialed by the caller. Additionally or alternatively, the priority engine determines whether a priority-indicating SIP message (e.g., Invite) was generated by the caller telephone.

If the call was not indicated as a priority call, then the call is treated as a normal call at the callee telephone at step 720. For example, the callee telephone will ring with a normal (e.g., default) ring tone. Alternatively, if the callee telephone is set to "busy" or "do not disturb," then the call may be routed directly to the callee voicemail without causing the callee telephone to ring.

However, if the call was indicated as a priority call, then at step 725 the priority engine obtains an appropriate whitelist from the callee profile saved in data storage (e.g., data storage 55). In embodiments, the priority engine accesses the callee profile and examines the callee-defined preferences to determine which whitelist, if any, is in force based on at least one of the current date, time, and location of the callee (e.g., the current location of the callee being communicated to the priority engine by the location platform 70).

At step 730, the priority engine determines whether the caller is contained in the whitelist obtained at step 725. In embodiments, the priority engine accesses the whitelist from the callee profile and determines whether the caller endpoint (e.g., telephone number, SIP URI, etc.) matches one of the endpoints contained in the whitelist.

If the caller is not contained in the whitelist, then the call is handled as a normal call at step 720. However, if the caller is contained in the whitelist, then the call is treated as a priority call at step 735. For example, the priority call may cause the callee telephone to ring with a priority ring tone. Additionally, for IMS-enabled device, the priority call may callee telephone to generate a priority audio and/or visual alert. Additionally, if the callee telephone is set to "busy" or "do not disturb," the priority call may break through the setting and cause the callee telephone to ring and or generate an audio and/or visual alert.

Exemplary Operation

Exemplary implementations of the invention are described herein. It is understood that these exemplary implementations are provided for explanation purposes, and the invention is not limited to the examples described herein. In a first exemplary implementation, Subscriber A operates a cellular telephone device (e.g., first endpoint 40), and Subscriber B operates a fixed (e.g., POTS) telephone device (e.g., second endpoint 45). Subscriber A uses the browser interface (e.g., browser interface 60) to add the Subscriber B's telephone device identity (e.g., telephone number) to Subscriber A's whitelist. Subscriber B originates a call to Subscriber A in which Subscriber B uses a features code (e.g., a unique dialing prefix) to designate the call as a priority call. Since the Subscriber B's telephone identity is contained in the Subscriber A's whitelist, the call is handled as a priority call. For example, upon receiving the call, the Subscriber A's telephone outputs a designated ring-tone associated with the Subscriber B's visually displayed standard caller-ID indicator. In this manner, the Subscriber A is made aware of the priority, and may decide how to handle the incoming priority call (e.g., answer the call, do not answer the call, press a button sending the call to voicemail, etc.). For example, Subscriber A may be in an important meeting; however, Subscriber A may decide to answer the call upon recognizing that the call is a priority call from a family member (e.g., spouse, child, etc.).

In a second example, Subscriber C operates an IMS handset (e.g., telephone) on an IMS enabled network, and Subscriber D also operates an IMS handset on an IMS network. Subscriber C adds Subscriber D's device identification (e.g., SIP URI) to his or her whitelist. When Subscriber D initiates a priority call to Subscriber C, Subscriber C's telephone generates a visual and audible indicator indicating that the call from Subscriber D is a priority call. Subscriber C may decide to ignore the call, for example, using conventional techniques to route the call to voicemail.

In a third exemplary implementation, Subscribers C and D are equipped as described above. Supposing that Subscriber C wants to leave a message for subscriber D without disturbing Subscriber D, Subscriber C may use the dialing interface (e.g., dialing interface 100) to initiate a call that is routed directly to Subscriber D's voicemail. In this manner, Subscribers D's telephone does not ring and instead a voice mail icon with Subscriber C's number shows up subsequently on Subscriber D's handset.

In a fourth example, Subscriber C removes Subscriber D from her whitelist. When Subscriber D subsequently calls Subscriber C again, the priority indicator (visual and audible) now does not show up with the caller ID display on Subscriber C's telephone. That is to say, even though Subscriber D may still attempt to initiate a priority call to Subscriber C, the call will not be handled as a priority call at Subscriber C's telephone because Subscriber D is no longer contained in Subscriber C's whitelist.

In a fifth exemplary implementation, Subscriber B (as described above) uses a web browser (e.g., browser interface 60) to add mobile Subscriber C to his priority call voice list (e.g., whitelist), updating the IN infrastructure on his network. Subscriber C utilizes his IMS-enabled telephone to make a priority client using the SIP client on his handset and the priority call option (e.g., dialing interface 100). Upon receiving the call from Subscriber C, Subscriber B's telephone rings with a pre-established priority ring. This differs from the standard priority call feature provided by conventional IN networks, which plays a unique ring based on an origination list that does not reflect any action on the callers part. In other words, in conventional IN networks, a callee's telephone may ring with a unique ring tone anytime there is an incoming call from a number contained in a specified list; however, in such conventional schemes, there is no provision for the caller to designate the call as a priority call versus a normal call.

In a sixth example, Subscriber B (as described above) and Subscriber E both operate respective fixed (e.g., POTS) telephone devices. Subscriber B uses the interface (e.g., browser interface 60) to add Subscriber E to her whitelist. Subscriber E uses a priority feature code (e.g., a unique dialing prefix) when initiating a call to Subscriber B, the priority feature code designating the call as a priority call. Subscriber B's telephone rings with a unique ring tone when receiving the call from Subscriber E.

As described herein, implementations of the invention permit callees to create a white list to support priority calls. Moreover, callers can set a priority on placed calls. Additionally, callees are made aware of the priority of an incoming call. Furthermore, a callee's device can automatically process incoming calls based on priority by sending non-high priority calls or non-whitelist callers directly to voicemail when the callee sets their status to "busy" or "do not disturb." Even further a callee's device can automatically process incoming calls based on the callee's location by sending non-high priority calls or non-whitelist callers directly to voicemail when the callee is in a configured location associated with being busy (e.g., a "work" location with an associated whitelist). Still further, enhancements to IMS network calls using SIP call flow to allow SIP enabled application servers to control processing. Also, IN feature code processing is leveraged so that existing Class 4 and Class 5 exchanges are supported.

In embodiments implemented on IMS handsets, it is possible for whitelists to be enforced on the handset device using SIP signaling to deliver call priority information. As such, the callee is able to designate who can originate priority calls, and is able to alter their whitelist(s) "on the fly" using their IMS telephone device. Implementations utilize a BCGF (Breakout Gateway Control Function) as well as a BIGCF (Break In Gateway Control Function) to facilitate IMS to non IMS calls, and vice-versa. While abuse cannot be prevented completely, a whitelist callee controlled based approach implemented using aspects of the invention maximizes implementation value by preventing any random caller from using the feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A method implemented in a computer infrastructure for providing call prioritization, comprising:
   determining that an incoming call includes a priority indication designated by a caller;
   determining that the caller is contained in a whitelist; and
   handling the incoming call as a priority call at a callee telephone when the incoming call includes the priority indication and the caller is contained in the whitelist.

2. The method of claim 1, further comprising handling the incoming call as a normal call when at least one of: the incoming call is not designated as priority by the caller, and the caller is not contained in the whitelist.

3. The method of claim 1, wherein the handling the incoming call as a priority call comprises at least one of:
   outputting a priority ring tone at the callee telephone;
   outputting a priority audio signal at the callee telephone;
   outputting a priority visual signal at the callee telephone; and
   breaking through a "busy" setting of the callee telephone.

4. The method of claim 1, wherein the whitelist contains an identification of at least one endpoint from which the callee is willing to receive a priority call.

5. The method of claim 4, further comprising receiving the identification of the at least one endpoint from the callee before the incoming call is received.

6. The method of claim 5, further comprising storing the whitelist in a profile associated with the callee.

7. The method of claim 6, further comprising accessing the stored profile to retrieve the whitelist when the incoming call is received.

8. The method of claim 4, wherein the callee manages the whitelist using a browser interface.

9. The method of claim 8, wherein the browser interface is displayed on the callee telephone.

10. The method of claim 1, wherein the whitelist is associated with at least one of: a predefined location and a predefined time of day.

11. The method of claim 10, further comprising determining that the callee is within the predefined location.

12. The method of claim 10, further comprising determining that the incoming call occurs during the predefined time of day.

13. The method of claim 1, further comprising selecting the whitelist from a plurality of whitelists based on at least one of: callee location when the incoming call is received, and time of day when the incoming call is received.

14. The method of claim 1, wherein the determining that the incoming call is designated as priority by the caller comprises one of:
  receiving an Intelligent Network feature code that was dialed by the caller when the incoming call was initiated; and
  receiving a SIP message generated by a caller telephone.

15. The method of claim 1, wherein a service provider at least one of creates, maintains, deploys and supports a computer infrastructure that performs the handling.

16. The method of claim 1, wherein the handling is provided by a service provider under a subscription and/or fee agreement and/or based on advertising content to one or more third parties.

17. A computer program product comprising program code stored on a tangible storage device, which, when executed on a computing device, causes the computing device to:
  receive and store a plurality of whitelists;
  receive a call initiated from a caller telephone to a callee telephone, wherein the received call is designated as a priority call at the caller telephone when the call is initiated;
  determine that the call is designated as a priority call;
  obtain a callee location from a location platform;
  determine a particular whitelist from the plurality of whitelists based on the obtained callee location;
  determine whether the caller telephone is contained in the particular whitelist; and
  one of: generate a priority output at the callee telephone when the caller telephone is contained in the particular whitelist, and handle the call as a normal call when the caller telephone is not contained in the particular whitelist.

18. The computer program product of claim 17, wherein the plurality of whitelists are defined by the callee using a browser interface.

19. The computer program product of claim 17, wherein at least one of the plurality of whitelists is associated with at least one of: a predefined location, and a predefined time of day.

20. The computer program product of claim 17, wherein the program code further comprises the computing device to determine at least one of:
  that the callee is within the predefined location when the call occurs, and
  that the call occurs during the predefined time of day.

21. A system for providing call prioritization, comprising:
  a telephone device including a combination of hardware and software that operates to:
    determine that an incoming call is designated as priority by a caller and that the caller is contained in a whitelist stored in the telephone device; and
    generate one of a normal output and a priority output based on the determining,
  wherein the call is designated as a priority call by the caller when the call is initiated.

22. The system of claim 21, wherein the telephone device displays a dialing display including:
  a first button that when selected designates an outgoing call as a normal call;
  a second button that when selected designates the outgoing call as a priority call; and
  a third button that when selected routes the outgoing call directly to voicemail of the callee.

23. The system of claim 21, wherein the telephone device displays a browser interface through which the whitelist is managed.

24. The system of claim 21, wherein the whitelist comprises an identification of at least one caller from which a subscriber is willing to receive a priority call.

25. The system of claim 22, wherein:
  the dialing display includes a standard dialing keypad in addition to the first, second, and third buttons; and
  the incoming call is treated as a priority call only when both (i) the incoming call is designated as priority by the caller when the incoming call is initiated and (ii) the caller is identified in the whitelist.

* * * * *